United States Patent [19]
Hayakawa

[11] Patent Number: 5,938,173
[45] Date of Patent: Aug. 17, 1999

[54] DEVICE FOR PREVENTING GLAND NUT IN VALVE FROM LOOSENING

[75] Inventor: Hideyasu Hayakawa, Nirasaki, Japan

[73] Assignee: Kitz Corporation, Chiba-ken, Japan

[21] Appl. No.: 09/021,991

[22] Filed: Feb. 11, 1998

[30] Foreign Application Priority Data

Feb. 20, 1997 [JP] Japan ................................. 9-052386

[51] Int. Cl.⁶ ............................. F16K 31/44; F16B 39/28
[52] U.S. Cl. ..................... 251/214; 251/315.01; 411/196
[58] Field of Search ..................... 411/191–203, 119, 411/120, 121; 251/214, 315.01

[56] References Cited

U.S. PATENT DOCUMENTS 970,274  9/1910  Spencer ................................. 411/197

FOREIGN PATENT DOCUMENTS

| 59-191410 | 12/1984 | Japan . | |
|---|---|---|---|
| 3369 | of 1894 | United Kingdom | 422/191 |
| 20131 | of 1902 | United Kingdom | 411/192 |
| 26592 | of 1903 | United Kingdom . | |

*Primary Examiner*—Flemming Saether
*Attorney, Agent, or Firm*—Wenderoth, Lind & Ponack, L.L.P.

[57] ABSTRACT

A device for preventing a polygonal gland nut helically coupled with the stem of a valve from loosening includes a locking piece inserted non-rotatable on the stem. A pair of engaging claws are formed on the locking piece to engage with one of the lateral faces of the gland nut and also with two lateral faces of the gland nut adjoining each other straddled an intervening corner of the gland nut.

6 Claims, 3 Drawing Sheets

DEVICE FOR PREVENTING GLAND NUT IN VALVE FROM LOOSENING

BACKGROUND OF THE INVENTION

1. Field of the Invention

This invention relates to a device for preventing a gland nut used in a valve such as a ball valve from loosening as a consequence of rotation of the valve.

2. Description of Prior Art

Heretofore, a device illustrated in FIGS. 6 and 7 has been known as a means to effect the kind of prevention of interest herein.

This preventive device has found utility in a ball valve such as is provided with a fitting flange for fixing an actuator. This ball valve is adapted to open and close a ball by rotating a stem, accommodate packing in a packing chamber specifically provided in the fitting flange as a shaft sealing structure for the stem, and press this packing by tightening through a gland the packing with a hexagonal nut 1 helically coupled with the stem.

This hexagonal nut 1 has the helical union between itself and the stem loosen as a consequence of the opening and closing motion of the valve. Therefore, this loosening of the nut 1 is prevented by a lock plate 3. As illustrated in FIG. 6, the lock plate 3 has a pair of opposite engaging faces 2 engage with the opposed lateral faces of the hexagonal nut 1 and forms therein a fitting hole 5 provided with a pair of opposite engagement faces 4 fit for the stem, thereby enabling the nut 1 to be fixed to the stem.

According to this conventional device, however, since the lock plate 3 has the engaging faces 2 thereof engage with the two opposed faces of the hexagonal nut 1, the lock plate 3, detached from the nut 1, has to be re-attached to the nut 1 each time the nut 1 is rotated by an angle of 60 degrees in order to lock the nut 1 and the stem.

When the hexagonal nut 1 fitted with the lock plate 3 is used to tighten the packing, therefore, the nut 1 must be rotated by an angle of 60 degrees from the position of the lock plate 3. The device, as an inevitable consequence, entails such problems as enabling the tightening of the packing by the nut 1 to be only adjusted every 60-degree rotation of the nut 1 and requiring a considerable tightening force in order to ensure the 60-degree rotation.

SUMMARY OF THE INVENTION

The present invention has been developed for the purpose of solving the problems attendant with the prior art, and has the object of providing a device for preventing a gland nut in a valve from loosening that allows the gland nut to be fixed at a position to be reached after each rotation in one half of the angle required heretofore, and further enables the rotation of the gland nut to press a packing, thereby finely adjusting the sealing property of the packing.

To attain the object mentioned above, this invention provides a device for preventing a gland nut from loosening. The gland nut has a plurality of lateral faces and intervening corners and is used in a valve comprising a valve body having an open chamber, a valve member inside the valve body, a gland packing accommodated in the open chamber, and a stem projecting from the open chamber for operating to open and close the valve member. The stem is helically coupled with the gland nut, which serves to press the gland packing. The device comprises a locking piece inserted non-rotatably on the stem. A pair of engaging claws formed on the locking piece enable engagement with one of the lateral faces of the gland nut and also with two lateral faces of the gland nut adjoining each other astraddle an intervening corner of the gland nut.

The locking piece can have a plate face formed therein with a fitting hole incorporating therein an engaging part adapted to engage with a flat face of the stem, and formed thereon with the the pair of engaging claws. The prevention of loosening of the gland nut can be fortified by providing a plurality of such pairs of engaging claws at opposed positions, for example.

The gland nut can be locked by setting the engaging claws of the locking piece fast in position on the lateral faces of the gland nut and can be locked further infallibly by causing the engaging claws to be set astraddle the corner of the gland nut. In the case of a hexagonal gland nut, for example, the sealing property of the packing can be finely adjusted because this nut can be locked after each of the rotations of 30 degrees at a time. Thus, the interval of rotations of adjustment of this gland nut is halved as compared with the conventional gland nut.

The object, other objects, advantages and feature of the present invention will become more apparent to those skilled in the art from the accompanying drawings and following description of the present invention with reference to the drawings.

DETAILED DESCRIPTION OF THE PREFERRED EMBODIMENT

A preferred embodiment, in which a device of the present invention for preventing a gland nut from loosening is applied to a ball valve will be described below with reference to FIG. 1 to FIG. 5.

Figure 1:
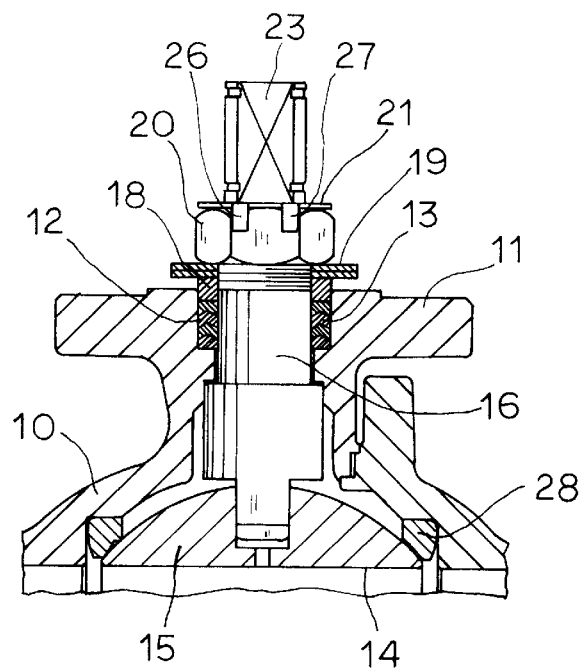
FIG. 1 is a partially longitudinal section illustrating one embodiment of the present invention.

As illustrated in FIG. 1, an open chamber 13 is formed in a flange part 11 adapted to fix an actuator (not shown) and formed on a body 10 of a ball valve, and a gland packing 12 is fitted in the chamber 13. The body 10 is provided therein with a ball 15 containing a through hole 14, and this ball 15 is rotated by a stem 16 for rotary operation. This stem 16 is projected from the open chamber 13. A screw part 17 is formed in the projected part of the stem 16, and a flat face 23 is formed in an oval shape above the screw part 17. The actuator has a drive shaft (not shown) and a handle (not shown) disposed above the stem 16. In FIG. 1, reference numeral 28 designates a ball seat, numeral 18 a gland, numeral 19 a washer, numeral 20 a gland nut that will be specifically described hereinbelow, and numeral 21 a locking piece which will be specifically described hereinbelow.

The gland nut 20 is helically joined to the screw part 17 of the stem 16 so as to press the gland packing 12 through the gland 18 and washer 19 and help the packing 12 to retain its sealing property. The present embodiment uses a hexagonal nut as the gland nut 20.

Figure 2:
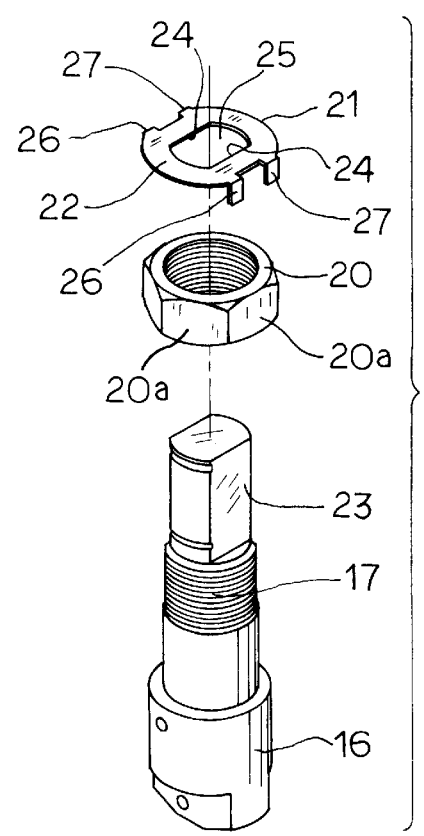
FIG. 2 is a magnified exploded view illustrating a stem, a gland nut, and a locking piece shown in FIG. 1 in a separated state.
Figure 3:
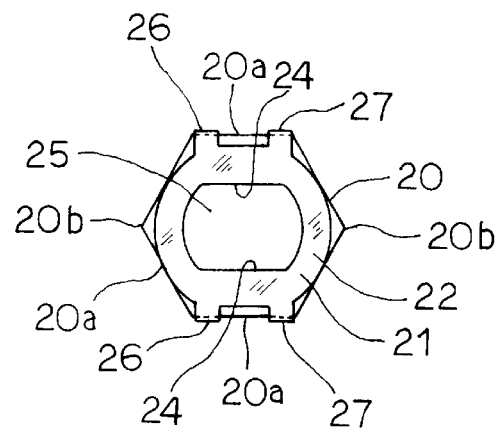
FIG. 3 is a plan view illustrating the gland nut of FIG. 2 having the locking piece of FIG. 2 fitted thereon.
Figure 4:
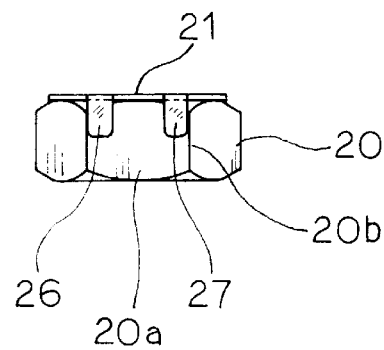
FIG. 4 is a front view of FIG. 3.

The locking piece 21 is obtained by press-molding a metal plate. As illustrated in FIGS. 1 and 2, it has a plate face 22 with a fitting hole 25 formed therein having an engaging part 24 for engagement with the flat face 23 of the stem 16. At opposed positions of this plate face 22, two sets of engaging claws 26 and 27 for engagement with lateral faces 20a of the gland nut 20 are respectively formed.

Figure 5:
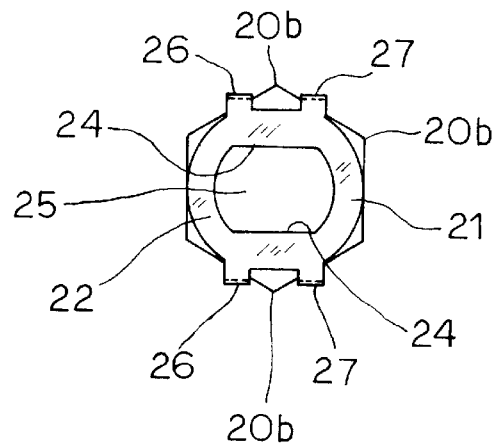
FIG. 5 is a plan view illustrating the locking piece of FIG. 3 set in position by a rotation of 30 degrees.
Figure 6:
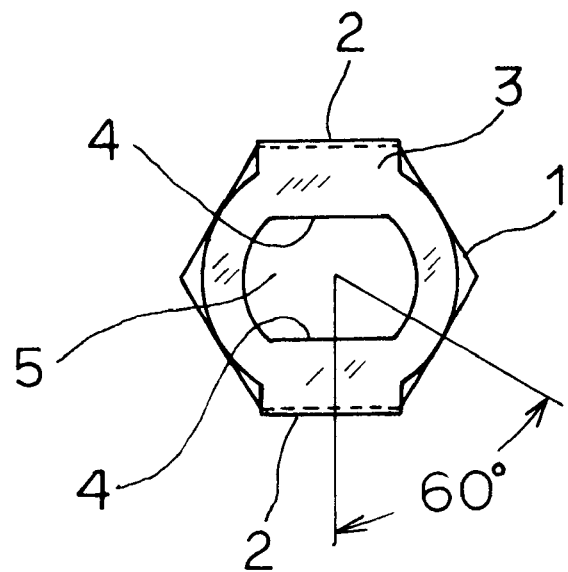
FIG. 6 is a plan view illustrating a nut and a locking piece in a typical conventional device for preventing the nut from loosening.
Figure 7:
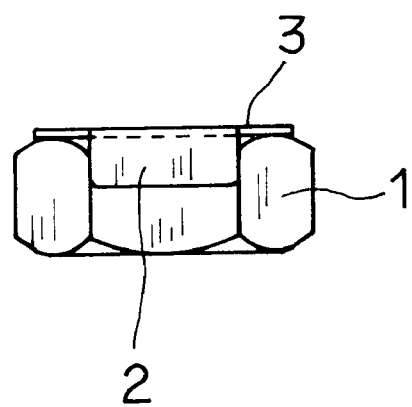
FIG. 7 is a front view of FIG. 6.

One set of the engaging claws 26 and 27 are disposed such that they can be engaged with one lateral face 20a of the gland nut 20 (FIG. 4) and can also be engaged with two lateral faces 20a and 20a of the gland nut 20 which adjoin each other astraddle an intervening corner 20b of the gland nut 20 (FIG. 5).

Next, the operation of the embodiment described above will be explained.

Since the gland nut 20 is loosened by being sympathetically rotated as a consequence of the repeated rotational motion of the stem 16, it is provided with the locking piece 21 which is adapted to fix the gland nut 20 and the stem 16 relative to each other.

This locking piece 21 is mounted on the gland nut 20, as shown in FIG. 1, with the fitting hole 25 thereof fit on the stem 16 when one of the lateral faces 20a of the gland nut 20 and the flat face 23 of the stem 16 are parallelly positioned. The two sets of engaging claws 26 and 27 of the locking piece 21 are engaged with the opposed lateral faces 20a of the gland nut 20 to lock the nut 20 and the stem 16 to each other.

In that state, the gland nut 20 retains the sealing property of the gland packing 12. In order to make the sealing property more reliable, the gland nut 20 is tightened to press the gland packing 12. In this case, the locking piece 21 is separated from the stem 16 and the gland nut 20 is rotated by angles of 30 degrees at a time so that each set of engaging claws 26 and 27 are engaged with two lateral faces 20a of the gland nut 20 adjoining to each other astraddle an intervening corner 20b of the gland nut 20 as illustrated in FIG. 5.

Since the tightening of the gland packing 20 can be finely adjusted at intervals of 30 degrees as described above, the rotation of the gland nut 20 for the adjustment is halved as compared with the conventional equivalent, thus improving the process.

Though this embodiment has depicted a case of specifically using a ball valve, the present invention does not need to be limited to a ball valve, but may be effectively applied to other valves. The gland nut does not need to be a hexagonal nut but may be any other polygonal nut.

The embodiment described above contemplates providing two opposed pairs of engaging claws. One pair of engaging claws suffices to effect the expected prevention of loosening. The discrimination between one pair and a plurality of pairs of engaging claws may be decided depending on the thoroughness with which the loosening is to be prevented.

It is clear from the description given above that since this invention uses the locking piece which is capable of locking the gland nut both on a pair of opposed lateral faces and on two pairs of opposed lateral faces, each pair being lateral faces adjoining to each other astraddle an intervening corner, it produces prominent effects such as fixing the nut at positions which are each reached by the rotation of one half of the angle required for the prior art lock plate, permitting fine adjustment of the sealing property of the packing, and helping the valve to manifest the sealing function for a long time. Since the device is simple in structure, it permits inexpensive quantity production.

What is claimed is:

1. An apparatus comprising:

a valve comprising a valve body having an open chamber, a valve member inside said valve body, a gland packing in said open chamber, and a stem for operating said valve member to open and close projecting from said open chamber, said stem having a helical portion and a flat face thereon;

a gland nut having a plurality of lateral faces, and intervening corners between said lateral faces, said gland nut being helically coupled with said helical portion of said stem so as to press said gland packing; and a locking piece non-rotatably mounted on said stem, said locking piece comprising a plate having a fitting hole therein, said fitting hole receiving said stem therethrough, said fitting hole having an engaging part engaging with said flat face of said stem, and said locking piece further comprising a pair of engaging claws extending from one side of said plate and spaced with respect to each other so as to be capable of, in one position, together engaging with one of said plurality of lateral faces of said gland nut, and in another position in which said gland nut is rotated an angle that is one half of the angular extent of one of said lateral faces with respect to said one position, engaging two of said plurality of lateral faces adjoining each other astraddle one of said intervening corners intervening between said two of said plurality of lateral faces.

2. The apparatus of claim 1, and further comprising a second pair of engaging claws formed on said locking piece at a position opposite to said pair of engaging claws.

3. The apparatus of claim 2, wherein said second pair of engaging claws extend from one side of said plate and spaced with respect to each other so as to be capable of, in one position, together engaging with one of said plurality of lateral faces of said gland nut, and in another position in which said gland nut is rotated an angle that is one half of the angular extent of one of said lateral faces with respect to said one position, engaging two of said plurality of lateral faces adjoining each other astraddle one of said intervening corners intervening between said two of said plurality of lateral faces.

4. The apparatus of claim 3, wherein said locking piece is shaped metal plate.

5. The apparatus of claim 2, wherein said locking piece is shaped metal plate.

6. The apparatus of claim 1, wherein said locking piece is shaped metal plate.

* * * * *